July 25, 1950 G. W. ZIEGLER 2,516,823
PHONOGRAPH DISK RECORD DISPENSING MACHINE
Filed June 21, 1946 5 Sheets-Sheet 1

INVENTOR.
George W. Ziegler.
BY
Harness, Dickey & Pierce.
ATTORNEYS.

July 25, 1950  G. W. ZIEGLER  2,516,823
PHONOGRAPH DISK RECORD DISPENSING MACHINE Filed June 21, 1946  5 Sheets-Sheet 3

INVENTOR.
George W. Ziegler.
BY
Harness, Dickey & Pierce.
ATTORNEYS.

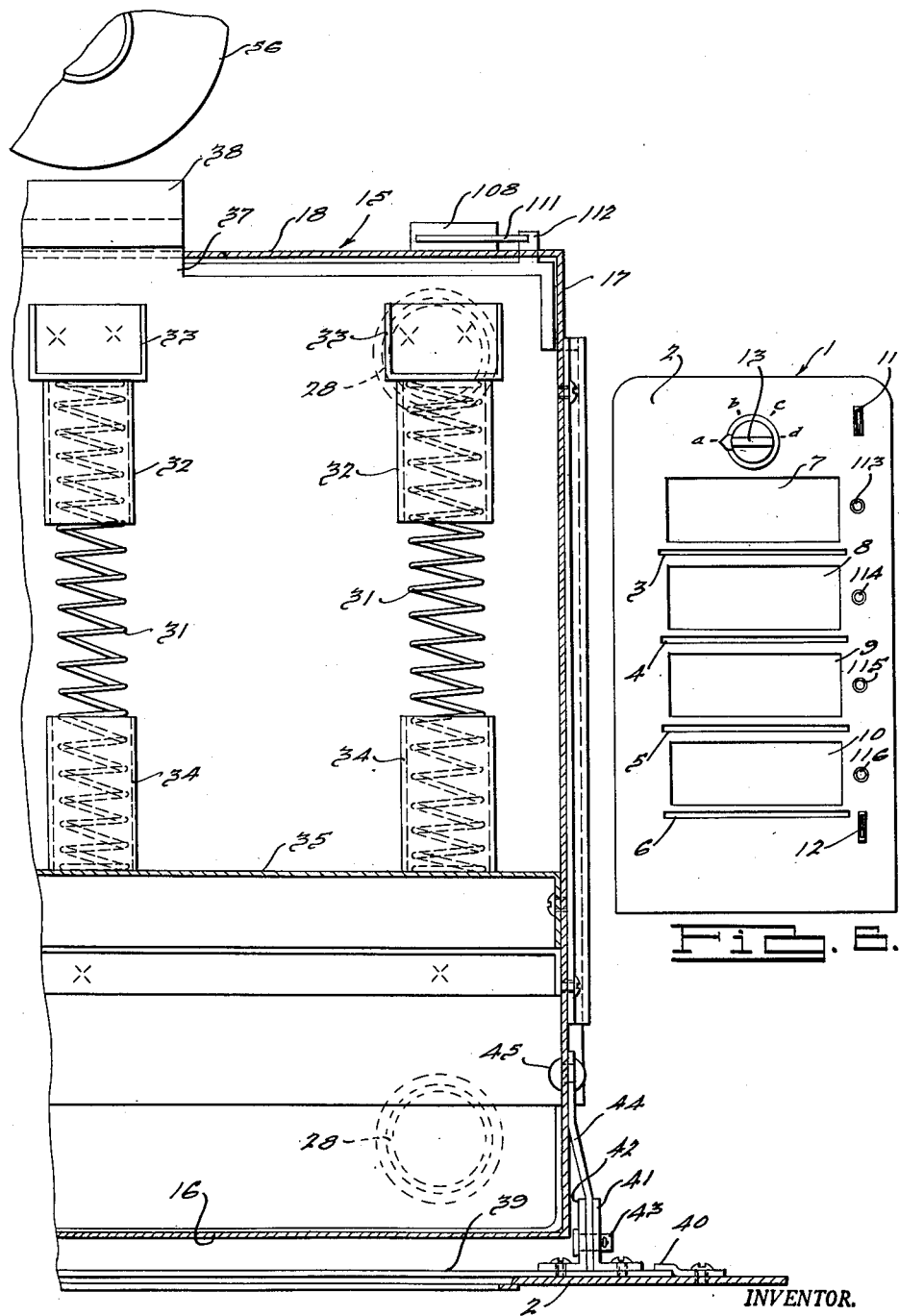

July 25, 1950            G. W. ZIEGLER            2,516,823

PHONOGRAPH DISK RECORD DISPENSING MACHINE

Filed June 21, 1946            5 Sheets-Sheet 5

INVENTOR.
George W. Ziegler.
BY
Harness, Dickey & Pierce.
ATTORNEYS.

Patented July 25, 1950

2,516,823

UNITED STATES PATENT OFFICE 2,516,823

PHONOGRAPH DISK RECORD DISPENSING MACHINE

George W. Ziegler, Chicago, Ill., assignor to Jerome V. Kelly, Detroit, Mich.

Application June 21, 1946, Serial No. 678,315

3 Claims. (Cl. 312—66)

The present invention relates to a coin controlled machine for dispensing phonograph disk records or similarly shaped flat articles, whether circular or square in outline.

It is one object of the present invention to provide a machine of the type mentioned in which the articles are dispensed from the machine by power operated means under the influence of a coin responsive mechanism.

A further object of the invention is to provide a machine of the type mentioned capable of dispensing a disk from any one of a plurality of reservoirs, each containing a plurality of disks, and in which the reservoir from which an article is to be dispensed is determined by manual operation of a selector mechanism.

Another object of the present invention is to provide an improved power operated means incorporating a simple and practical mechanism for selectively driving any one of a plurality of devices.

A further object of the invention is to provide an improved means for supporting a stack of flat articles in such a manner as to facilitate discharge of one of the articles from the stack at a time.

Another object of the invention is to provide automatic control means for a machine of the type described including, among other features, a mechanism for returning any coin or coins deposited in the machine when the operator has selected for discharge an empty reservoir.

Other objects and advantages of the mechanism will become apparent from the following specification, the accompanying drawings and the appended claims.

In the drawings:

Figure 5 is a fragmentary, horizontal section taken on the line 5—5 of Figure 2;

Figure 6 is a small scale, front elevation of the machine;

Figure 1:
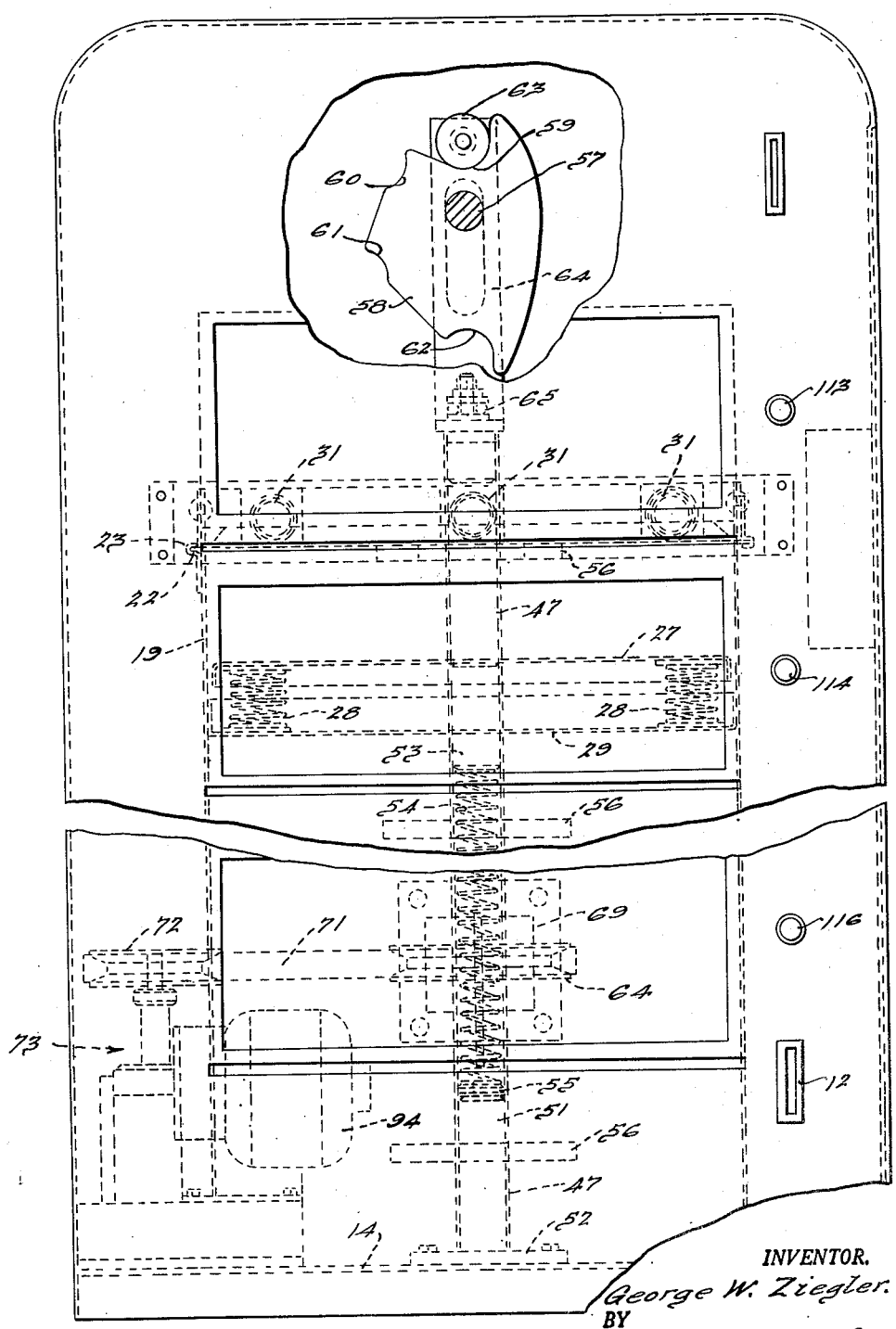
Figure 1 is a front view of the machine.

As best shown in Figures 1 and 6, the machine comprises a sheet metal casing 1, which may be of any desired form. The front wall 2 of the casing is provided with four slots, indicated by the numerals 3, 4, 5 and 6, through which articles may be discharged. Above each of the discharge slots is an opening in which may be fitted placards 7, 8, 9 and 10, respectively, designating the character of the articles which will be discharged from the associated slots. In the case of phonograph disc records, the placards could, for example, indicate the title of the composition, the name of the composer and the artist or organization who made the recording. The front of the machine is also provided with a coin deposit slot 11 and a coin return slot 12. A selector knob 13 is likewise positioned on the front face of the machine and adapted to be rotated to any one of four positions to select the desired article for discharge from the machine.

Figure 2:
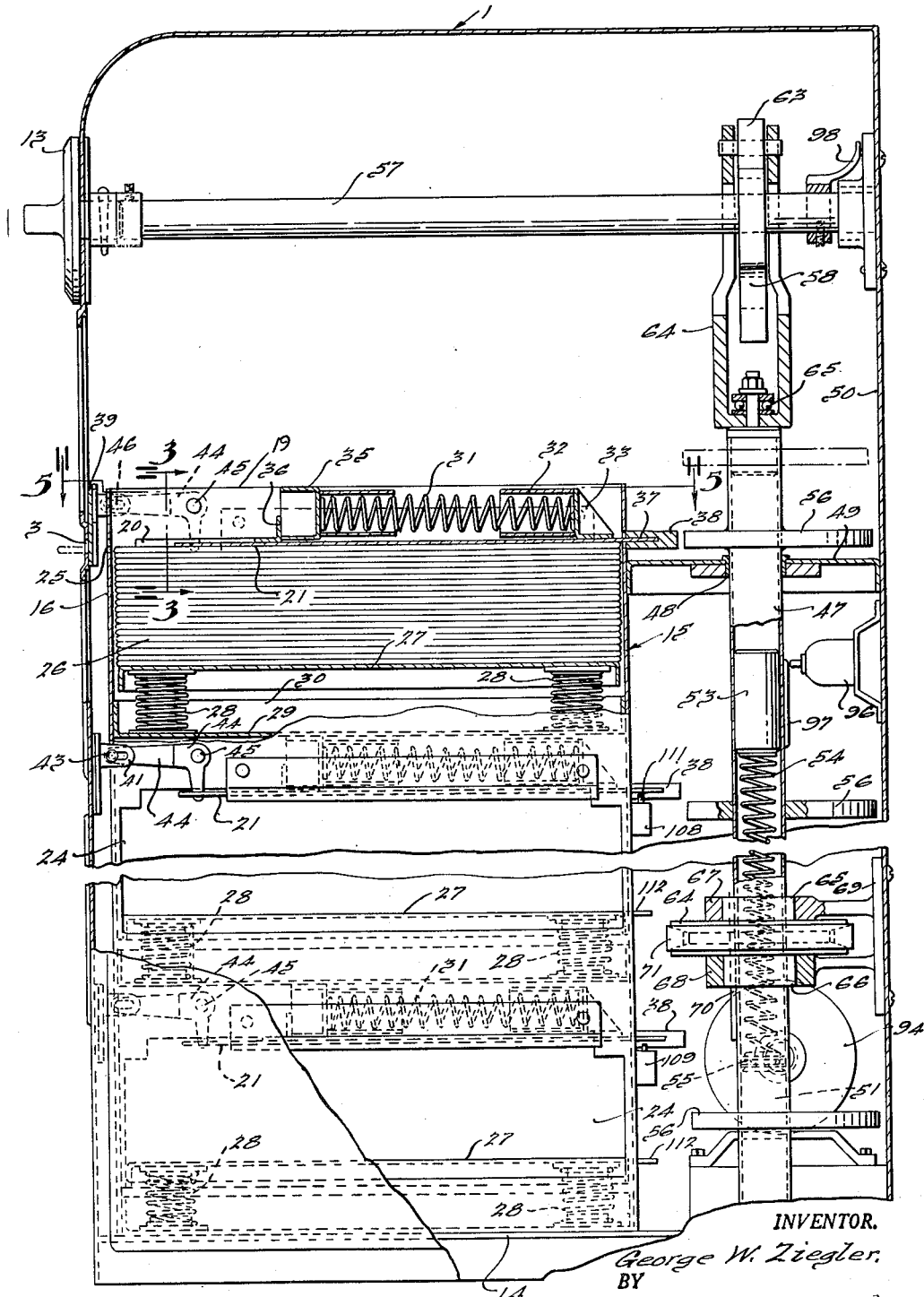
Figure 2 is a vertical, fragmentary, sectional view taken in part through the center line of the machine.
Figure 3:
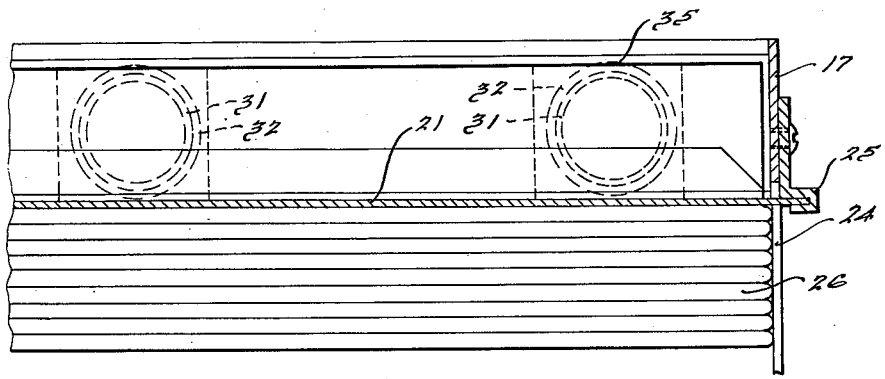
Figure 3 is a fragmentary, sectional view taken on the line 3—3 of Figure 2.

The casing 1 includes an imperforate bottom wall 14 which, as best shown in Figure 2, supports a sheet metal column, indicated generally at 15. The column 15 is square in horizontal cross section and consists of four vertically extending walls 16, 17, 18 and 19. The wall 19 is provided with four horizontal slots 20, one of which appears near the top of the column 15 in Figure 2. A shelf 21 of approximately the same peripheral contour as the cross section of the column 15 is located in the plane of each of the slots 20. The shelves 21 have laterally projecting edge portions, one of which projects through the adjacent slot 20 in wall 19, as indicated at 22 in Figure 1, and is received within a channel-shaped bracket 23 secured to the side wall 19 of the column 15. The opposite sides of each of the shelves 21 have similar lateral projections, which extend through enlarged openings 24 in the side wall 17 and engage within channel-shaped brackets 25 secured to the side wall 17, in the manner best shown in Figure 3.

The openings 24, as best shown in Figure 2, extend horizontally for substantially the full width of the side wall 17 and are of substantial vertical extent in order to provide an opening through which the column 15 may be loaded with articles such as phonograph disk records. The front wall 16 of the vertical column 15 is provided with a plurality of slots 25, one aligned with each of the shelves 21. The openings 25 are aligned with the openings 3, 4, 5 and 6 in the front wall 2 of the outer casing and serve as discharge slots for the uppermost article or disk from a stack of disks which is held in contact with the lower surface of each of the shelves 21.

As best shown in Figure 2 in connection with the uppermost shelf 21, a stack of disks 26 is supported upon a vertically movable shelf 27, which is urged upwardly by a plurality of springs 28 in such a manner as to hold the uppermost disk of the stack in contact with the under surface of the shelf 21. The lower ends of the springs 28 rest upon shelves 29, the peripheral flange 30 of which is fixed to the side walls of the column 15.

Each shelf 21 is slidable fore and aft in the channel-shaped brackets 23 and 25 and is normally urged rearwardly by a plurality of springs 31, the rearward ends of which are fitted within tubes 32 carried by brackets 33 fixed to the shelf 21. The forward ends of springs 31 are fitted within tubes 34 carried by a channel-shaped member 35, which extends between and is connected to the side walls 17 and 19 of the vertical column 15. Rearward movement of each shelf under the influence of springs 31 is limited by engagement of an angle iron member 36, which is fixed to the shelf with the forward edge of the channel 35, as best shown in Figure 2.

Each of the shelves, at the central portion of its rear edge, has a rearward projection 37 to which is fixed a pusher block 38. Each of the pusher blocks 38 extends below the plane of the under surface of its associated shelf 21 by an amount slightly less than the thickness of the articles or disks which are to be discharged from the machine. Consequently, on forward movement of a pusher and its associated shelf 21, the uppermost disk in the stack will be advanced and discharged through the aligned openings in the walls 2 and 16.

Figure 4:
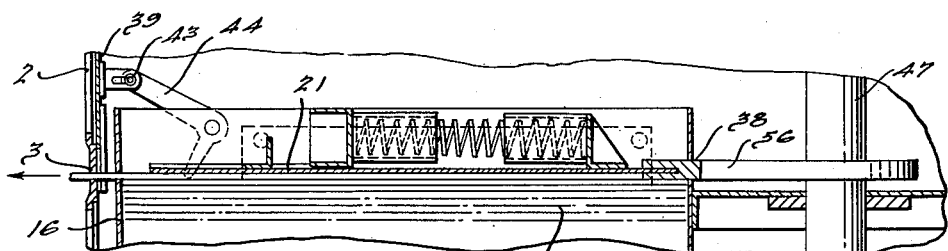
Figure 4 is a fragmentary, sectional view similar to Figure 2 but showing the parts in a different position.

The openings 3, 4, 5 and 6 in the front wall 2 of the outer casing are normally closed by means of vertically slidable shutters. Thus, as best shown in Figure 2, the opening 3 is normally closed by a shutter 39 which, as indicated in Figure 5, is guided at its side edges by guide brackets 40. At the right-hand end of the shutter 39 is fixed a pair of oppositely positioned angle brackets 41 and 42 through which projects a pin 43. A bell crank lever 44, pivoted on a rivet 45 carried by the side wall 17 of the vertical column, projects between the brackets 41 and 42 and is provided with an elongated slot 46, which receives the pin 43. The bell crank lever 44 has a vertically downwardly extending leg which projects through a suitable slot in that portion of the shelf 21 which projects outwardly beyond the wall 17. A similar arrangement of brackets and bell cranks is provided at the left-hand end of each shutter. As a result of this construction, when one of the shelves is advanced forwardly, the bell crank levers associated therewith are rotated in a clockwise direction into the position shown in Figure 4, in which they elevate the shutter 39 and thus expose the opening in the front wall 2 of the casing. At the same time, the pusher 38 advances the uppermost disk in the stack and projects it through the opening in the front wall of the housing a sufficient distance to permit the person operating the machine to grasp the disk and withdraw it from the machine.

A power operated means for selectively advancing one of the pushers 38 is provided, as best shown in Figures 1 and 2. This mechanism includes a tubular shaft 47, which is journaled adjacent its upper end for rotation and axial reciprocation in a bearing 48 carried by a support 49 which extends between and is fastened to the vertical column 15 and the rear wall 50 of the main housing 1. The lower end of the tubular shaft 50 is journaled on a cylindrical plug 51, which fits within the tubular shaft and is fixed to a supporting plate 52 which is secured to the bottom wall 14 of the main housing. A second cylindrical plug 53 is fixed within the tubular shaft 47 intermediate its ends and serves as an abutment for the upper end of a spring 54. The lower end of the spring seats on a ball thrust bearing 55, which rests on the upper end of the plug 51. As a result of this construction, the spring 54 tends to elevate the shaft 47. However, the strength of this spring is so selected that in no case does it exert sufficient force to support all of the weight of the shaft and associated mechanism. The function of the spring is, therefore, to act as a counterbalance which partially supports the shaft.

A plurality of eccentric cams 56 is fixed to the shaft 47 in spaced relation, the spaces between the cams being equal but slightly greater than the spaces between the pushers 38. As a result of this construction, only one cam can be positioned in operative relation with respect to its associated pusher 38 at a time. When the parts are in the position shown in Figure 2, the uppermost cam is in a position to operate the uppermost pusher 38. On elevation of the shaft 47, the next lower cam will be brought into position to operate the next pusher 38, and, on further elevation, a third cam will be placed in position to operate the third pusher, etc.

In the particular embodiment of the invention illustrated, four disk reservoirs are provided. Consequently, the machine includes four pushers and four pusher operating cams 56. The manually operated selector knob 13 is connected to a suitable mechanism effective to adjust the shaft 47 vertically and thus position it to operate any one of the four pushers. Thus, the knob 13 is fixed to a shaft 57, which is journaled in the front and back walls of the casing and carries an irregularly shaped cam 58, the form of which is best illustrated in Figure 1. As there shown, the cam 58 is provided with four notches 59, 60, 61 and 62, each positioned at a progressively greater distance from the axis of shaft 57 than the preceding notch and each adapted to receive a roller 63 carried by the upper end of a yoke 64, which is rotatably secured to the upper end of the shaft 47 by means of a ball thrust bearing 65 in such a manner that on elevation of the yoke the shaft will be lifted.

It will be observed from Figure 1 that the shape of the cam 58 is such that it cannot be rotated in a counterclockwise direction beyond the position in which the roller is received in notch 59, or in a clockwise direction beyond the position in which the roller is received in notch 62. Moreover, the cam is so formed that the roller 63 cannot dwell intermediate the notches 59, 60, 61 and 62; it must at all times come to rest in one of the notches. Consequently, shaft 47 will always be in position to operate one of the four pushers.

As best shown in Figure 2, the shaft 47 is rotated by a pulley 64 having a pair of axially projecting hub portions 65 and 66, which slidably fit the shaft 47 and which are journaled for rotation within suitable openings in a pair of brackets 67 and 68 carried by a plate 69 fixed to the rear wall 50 of the housing. An axially extending key 70 is fixed to the shaft 47 and fits within a suitable keyway within the hubs 65 and 66 of the pulley 64 in order to effect a driving connection between the pulley and the shaft. As a result of this construction, the pulley may drive the shaft, regardless of the vertical position of adjustment of the shaft.

As best shown in Figure 1, the pulley 64 is driven by a belt 71 from a pulley 72 fixed to the output shaft of a drive unit, indicated generally at 73, consisting of an electric motor and a geared speed reducer mounted within a single casing. The detailed construction of the motor and speed reducing unit forms no part of the present invention and hence need not be further illustrated or described. A wide variety of such mechanisms is commercially available and the selection of an appropriate unit may be made readily by those skilled in the art.

The machine is provided with an electrical control circuit and associated mechanism adapted to energize the motor drive unit 73 for a sufficient period to cause one complete revolution of the tubular shaft 47 and then bring the machine to a stop. The control circuit is energized by the deposit of a coin in the coin slot 11, which deposit should, of course, be made after the selector knob 13 is rotated to the desired position so that the desired article will be discharged. The control circuit includes means for returning the deposited coin in the event that the selector knob 13 is turned to a position corresponding to that of an empty reservoir.

Figure 7:
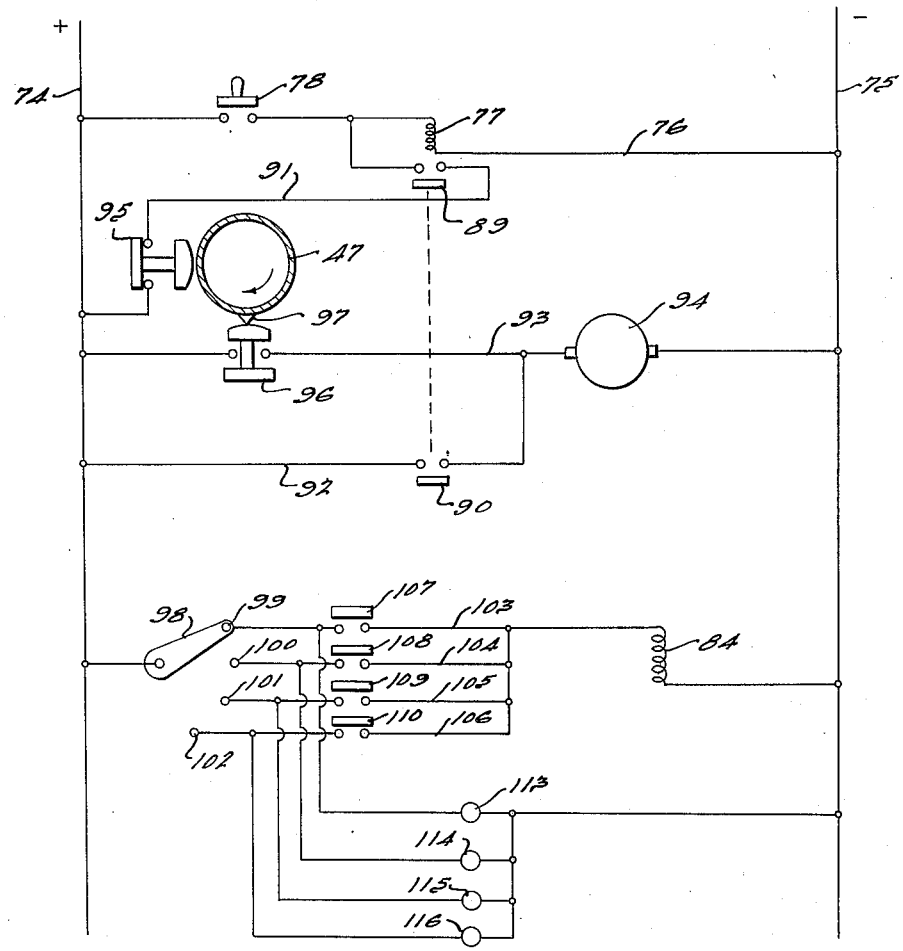
Figure 7 is a diagrammatic wiring diagram for the mechanism.

As best shown in Figure 7, the electrical control circuit includes a pair of lines 74 and 75, which may be connected to any suitable source of electrical energy. Connected between the lines 74 and 75 is a line 76 containing the coil of relay 77 and a coin operated switch 78. The switch 78 may be of any desired or conventional construction, so long as it is closed in response to the deposit of a suitable coin in the machine when the indicating knob is turned to a position corresponding to that of a reservoir which contains articles.

Figure 8:
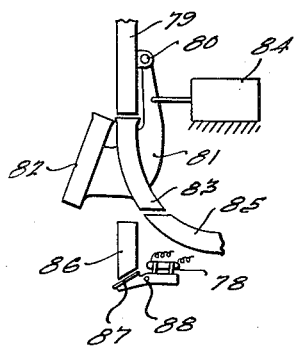
Figure 8 is a more or less diagrammatic view showing the type of coin return and actuating mechanism employed in the preferred form of the invention.

One suitable arrangement of the mechanism for this purpose, adapted to be operated by a single coin, is illustrated more or less diagrammatically in Figure 8. As there shown, the mechanism includes a coin chute 79, which is connected to the coin slot 11 through any suitable or conventional form of slug rejecter (not shown). In accordance with conventional practice, the slug rejecter performs the function of rejecting and returning defective coins and, consequently, only good coins will be discharged through chute 79.

Pivotally mounted by a pin 80 on the chute 79 is a bracket 81, which carries a pair of short coin chutes 82 and 83. The arrangement is such that by pivoting the bracket 81 about the pin 80, the upper end of either of the chutes 82 or 83 may be swung into alignment with the lower end of the chute 79. A solenoid 84 is provided for swinging the bracket 81 and the parts are shown in the position in which the solenoid is energized. In that position, the chute 83 is aligned with the chute 79 and also with a chute 85, which leads to the coin return pocket 12 of Figure 6. Consequently, when the solenoid 84 is energized, coins will pass through chutes 79, 83 and 85 and be returned at the pocket 12. When the solenoid 84 is de-energized, chute 82 will align at its upper end with the chute 79 and at its lower end with a chute 86. This is the normal position of the bracket 81. In that position, coins deposited in the machine will pass through the chutes 79, 82 and 86 and impinge against a pivoted closure plate 87, which normally closes the lower end of the chute 86. The plate 87 is pivoted on a fixed pin 88 and is adapted, in response to the weight or impact of coins discharging from chute 86, to pivot in a counterclockwise direction and permit the coins to drop into a suitable storage compartment (not shown).

The pivotal movement of the closure plate 87 necessary to permit passage of a coin is utilized to close an electrical circuit momentarily. While this may be accomplished in any desired manner, as indicated diagrammatically in Figure 8, it is preferably achieved by mounting a mercury contact switch 78 on the pivoted closure plate 87 in such a manner that the circuit through the switch is normally open but will be closed upon any counterclockwise pivotal movement of the plate. It will thus be apparent that the previously mentioned switch 78, which is connected in line 76 of the electrical circuit, will be momentarily closed only upon the deposit of a proper coin in the machine when the selector knob is in a position corresponding to that of a reservoir which contains articles for discharge.

The relay 77 has a pair of normally open contacts 89 and 90, the former being located in a holding circuit 91 for the relay 77 and the latter in a branch line 92, which extends from the line 74 to a line 93 which, in turn, connects the lines 74 and 75 and contains the motor 94 of the power unit indicated generally at 73 in Figure 1. The holding circuit 91 also contains a normally closed switch 95, while the previously mentioned line 93 contains a similar normally closed switch 96. The switches 95 and 96 are opened by a longitudinal cam-like rib 97 which, as best shown in Figure 2, is fixed to the tubular shaft 47. The rib 97 is of sufficient length to co-act with the switches 95 and 96, regardless of the vertical position of adjustment of the shaft 47. The switches 95 and 96 may be fixed in any desired manner within the housing in position to co-operate with the rib 97. The arrangement is such that when the rib 97 engages and opens the normally closed switch 96, the parts are in their starting position, illustrated in the drawings, in which the pushers 38 are fully retracted by the springs 31. The normally closed switch 95 is so positioned with respect to the switch 96 that it will be engaged by the rib 97 and thereby opened after the rib has left switch 96 and permitted the latter to close.

As best shown in Figures 2 and 7, the shaft 57 is connected to the selector knob 13 and carries a switch arm 98, which is adapted to engage any one of a plurality of contacts 99, 100, 101 or 102, depending upon the position of adjustment of the knob 13, and thereby establish an electrical circuit through one of the branch lines 103, 104, 105 or 106 to the coin reject solenoid 84. The branch lines 103, 104, 105 and 106 each contains a normally open limit switch 107, 108, 109 and 110, respectively. As best shown in Figures 2 and 5, these limit switches are mounted on the rear wall 18 of the vertical column 15 and are provided with operating arms adapted to co-operate with projections fixed to the supporting plates 27. Thus, for example, as best shown in Figure 5, the limit switch 108 has an operating arm 111, which is adapted to be engaged by a bent-up tab 112 fixed to the supporting plate 27 located immediately below the operating arm. As a result, when all of the disks positioned upon any one of the supporting plates 27 have been discharged from the machine, the bent-up tab on that supporting plate will lie flush with the under surface of the associated shelf 21 and, accordingly, will have elevated the operating arm 111 in a directio to close the limit switch 108. The supporting plates in each of the four reservoirs of the machine are provided with similar bent-up tabs 112, which operate the respective limit switches 107, 108, 109 and 110.

As a result of this construction, it will be apparent that if the selector knob is adjusted to a position corresponding to a reservoir which contains no disks, it will close a circuit through one of the lines 103, 104, 105 or 106 and thereby energize the coin return solenoid 84.

If desired, the machine may also be equipped with indicating lights, which are located in proximity to the several discharge reservoirs and which are illuminated selectively in response to the position of the selector knob 13. Thus, as shown in Figure 7, four lamps 113, 114, 115 and 116 are provided, which may be located in the positions shown in Figure 6 and which will be illuminated when the selector knob is adjusted to the associated reservoir.

The operation of the machine is as follows. In Figures 1 through 7, the parts are shown in the position they assume when the selector knob 13 has been turned to a position corresponding to that of the uppermost reservoir and that reservoir contains a stack of disks. Under these circumstances, the bracket 81 in Figure 8 will be shifted to the right from the position there shown, thereby aligning chutes 79, 82 and 86 by reason of the fact that the limit switch 107 associated with the uppermost reservoir is open and, therefore, the coin return solenoid 84 is de-energized. Upon deposit of a coin in the slot 11, it will pass through the slug rejector and thence through chutes 79, 82 and 86 and effect a momentary closure of switch 78. This energizes the relay 77 which, by reason of the closure of its contact 89, establishes a holding circuit through line 91 and switch 95 which maintains the relay energized after switch 78 re-opens. Energization of relay 77 also closes the relay contact 90, thereby energizing motor 94 and effecting rotation of the shaft 47 and actuation of the pusher 38 by cam 56. This pushes the uppermost disk from the stack in the upper reservoir, in the manner previously described.

As soon as shaft 47 starts rotating, cam rib 97 leaves switch 96, thereby closing a circuit through line 93 to the motor 94. At that instant, two complete circuits are available to supply current to the motor and, consequently, no change in the operation of the mechanism occurs. As soon as the cam rib engages switch 95, it opens the holding circuit 91 to the relay 77. This de-energizes the relay and opens both of the relay contacts 89 and 90. Opening of contact 90 breaks the circuit through line 92, but the motor remains energized through line 93 and, consequently, continues to operate unaffected by the de-energization of relay 77. On completion of one revolution of shaft 47, the cam rib 97 re-engages and opens switch 96, thereby breaking the circuit to the motor 94 and restoring the parts to the position shown in Figure 7. This stops the operation of the mechanism with the parts in the starting position illustrated in Figures 1 to 7, inclusive.

The operation on selection of other reservoirs for discharge is the same except that the position of the selector knob 13 is changed as desired.

In the event that a selected reservoir is empty, the selector switch 98 will energize the coin return solenoid 84, thereby shifting the coin return mechanism to the position shown in Figure 8, in which position the coin is returned to the coin return pocket 12 without having an opportunity to engage the starting switch 78.

The particular form of coin controlled mechanism illustrated more or less diagrammatically in Figure 8 is constructed for use with a machine adapted to operate upon insertion of a single coin. It will be apparent to those skilled in the art, however, that multiple coin controlled mechanisms may be employed in lieu of the type illustrated. In that case, the pivoted closure plate 87 and its associated switch 78 will be replaced by a coin accumulator device of conventional construction which will effect a closure of a corresponding switch when a plurality of coins of a predetermined total value has been deposited. If the switch associated with the coin accumulator is of a type which remains closed until mechanically opened, the holding circuit 91 of Figure 7 may be omitted and the coin control switch opened either directly or indirectly by the cam rib 97 after it leaves engagement with switch 96.

Other variations in the design and arrangement of the control circuit may be indulged in without departing from the spirit of the invention.

An important feature of the invention resides in the fact that the disk stacks are supported upon vertically movable platforms carried by springs 28, and the further fact that the disks are discharged from the top of each stack. By properly adjusting the strength of springs 28 to only slightly overcome the weight of the disk stack, it is possible to reduce to a minimum value the friction which resists discharge of the uppermost disk. Moreover, by properly calibrating the spring characteristics with respect to the weight and thickness of the disks, it is possible to maintain the compression force acting on the uppermost disk at a substantially constant value, regardless of the number of disks in the reservoir. The underside of each shelf 21 is preferably highly polished to reduce friction between the disks and the shelf to a minimum and thus prevent inward return movement of an ejected disk on return of the shelf to the position shown in Figure 2. The disks are preferably enclosed in Manila paper envelopes to protect them and to provide a greater coefficient of friction between adjacent disks than between the top disk and shelf 21.

While only one form of the invention is illustrated and described, it is apparent that variations in the design and construction may be indulged in without departing from the spirit of the invention and the scope of the appended claims.

What is claimed is:

1. A coin controlled dispensing machine for flat articles including a plurality of reservoirs, each adapted to hold a stack of articles, an ejecting device for each reservoir for positively ejecting articles from said reservoir one at a time, a motor driven shaft mounted for rotation and axial reciprocation, means operatively associated with said shaft for establishing a driving connection between said shaft and a different one of said ejecting devices for each of a plurality of axial positions of adjustment of said shaft, a selector for axially adjusting said shaft, and coin controlled means for energizing said motor to effect a rotation of said shaft and thereby operate one of said ejecting devices.

2. A coin controlled dispensing machine for phonograph records including a housing, a plurality of vertically spaced supports, each adapted to support a vertical stack of disk records, independent resilient means for urging each support upwardly, independent means engageable with the uppermost record in each stack for limiting upward movement of said supports and maintaining the uppermost record in each stack in a given plane, a horizontally movable ejector for each stack adapted to engage and eject the uppermost record, a vertical shaft, ejector operating cam means on said shaft, said last mentioned means being effective on rotation of the shaft to operate one of said ejectors, means for adjusting the shaft axially to position said cam means in operative relation to any one of said ejectors, and power operated, coin controlled means for rotating said shaft.

3. A coin controlled dispensing machine for flat relatively thin articles, including a housing, a plurality of vertically spaced supports each adapted to support a vertical stack of articles, a horizontally movable ejector for each stack adapted to engage an article in said stack and eject the same from said housing, a vertical shaft, ejector operating cam means on said shaft, said last-mentioned means being effective on rotation of the shaft to operate one of said ejectors, means for adjusting the shaft axially to position said cam means in operative relation to any one of said ejectors, and power operated coin controlled means for rotating said shaft.

GEORGE W. ZIEGLER.

REFERENCES CITED

The following references are of record in the file of this patent:

UNITED STATES PATENTS

| Number | Name | Date |
| --- | --- | --- |
| 523,384 | Tirrell et al. | July 24, 1894 |
| 538,173 | Loewenbach et al. | Apr. 23, 1895 |
| 1,009,265 | Stern et al. | Nov. 21, 1911 |
| 1,083,608 | Gatling | Jan. 6, 1914 |
| 1,657,364 | Bartlett | Jan. 24, 1928 |
| 2,098,697 | Vanderput | Nov. 9, 1937 |
| 2,249,236 | Tratsch | July 15, 1941 |
| 2,348,927 | Runsvold et al. | May 16, 1944 |
| 2,392,511 | Thompson et al. | Jan. 8, 1946 |
| 2,423,621 | Sabaitis | July 8, 1947 |
| 2,427,628 | Silverman | Sept. 16, 1947 |

FOREIGN PATENTS

| Number | Country | Date |
| --- | --- | --- |
| 353,890 | Great Britain | July 21, 1931 |
| 354,418 | Great Britain | Aug. 13, 1931 |